United States Patent
Kiuchi

(10) Patent No.: US 12,474,932 B2
(45) Date of Patent: Nov. 18, 2025

(54) METHOD AND INFORMATION PROCESSING DEVICE

(71) Applicant: TOYOTA JIDOSHA KABUSHIKI KAISHA, Toyota (JP)

(72) Inventor: Yuuki Kiuchi, Ota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/405,064

(22) Filed: Jan. 5, 2024

(65) Prior Publication Data

US 2024/0330010 A1 Oct. 3, 2024

(30) Foreign Application Priority Data

Mar. 31, 2023 (JP) ................. 2023-059346

(51) Int. Cl.
*G06F 1/26* (2006.01)
*G06F 9/4401* (2018.01)

(52) U.S. Cl.
CPC ............ *G06F 9/4418* (2013.01); *G06F 1/263* (2013.01)

(58) Field of Classification Search
CPC ....................................................... G06F 1/26
See application file for complete search history.

(56) References Cited

U.S. PATENT DOCUMENTS

| | | | | |
|---|---|---|---|---|
| 8,612,779 | B2 * | 12/2013 | More | G06F 1/3203 713/320 |
| 10,843,645 | B1 * | 11/2020 | Lambert | B60L 1/12 |
| 2015/0023101 | A1 * | 1/2015 | Tanaka | G06F 1/3275 365/185.11 |
| 2017/0355268 | A1 * | 12/2017 | Roberts | B60L 53/11 |
| 2020/0389338 | A1 * | 12/2020 | Park | H04L 12/40 |
| 2022/0179644 | A1 * | 6/2022 | Harata | B60R 16/02 |
| 2023/0315307 | A1 * | 10/2023 | Ge | G06F 11/004 711/154 |
| 2024/0012467 | A1 * | 1/2024 | Bi | G06F 1/3287 |

FOREIGN PATENT DOCUMENTS

| | | |
|---|---|---|
| JP | 2014-088150 A | 5/2014 |
| JP | 2017-199230 A | 11/2017 |

* cited by examiner

*Primary Examiner* — Phil K Nguyen
(74) *Attorney, Agent, or Firm* — Oliff PLC

(57) ABSTRACT

An information processing device increment a first delay count when a sleep transition time exceeds a first prescribed time, the sleep transition time being a time from when an ECU mounted on the vehicle goes into a non-sleep state until the electronic control unit returns to a sleep state. The information processing device outputs information on the ECU when the first delay count becomes equal to or greater than a first prescribed count.

7 Claims, 3 Drawing Sheets

METHOD AND INFORMATION PROCESSING DEVICE

CROSS-REFERENCE TO RELATED APPLICATION

This application claims priority to Japanese Patent Application No. 2023-059346 filed on Mar. 31, 2023, incorporated herein by reference in its entirety.

BACKGROUND

1. Technical Field

The present disclosure relates to methods and information processing devices.

2. Description of Related Art

Technology related to detecting behaviors of electronic control units (ECUs) is conventionally known in the art. For example, Japanese Unexamined Patent Application Publication No. 2014-088150 (JP 2014-088150 A) discloses that node information including a cause for activation and a time stamp for activation of each ECU is stored in chronological order, so that when an abnormality in an in-vehicle battery is detected, a cause of the battery abnormality is identified from changes in the operating conditions of the ECUs based on the stored node information.

SUMMARY

There is room for improvement in the technology related to detecting behaviors of ECUs.

In view of such circumstances, it is an object of the present disclosure to improve the technology related to detecting behaviors of ECUs.

A method according to an embodiment of the present disclosure is a method that is performed by an information processing device mounted on a vehicle. The method includes: incrementing a first delay count when a sleep transition time exceeds a first prescribed time, the sleep transition time being a time from when an ECU mounted on the vehicle goes into a non-sleep state until the ECU returns to a sleep state; and outputting information on the ECU when the first delay count becomes equal to or greater than a first prescribed count.

An information processing device according to an embodiment of the present disclosure is an information processing device mounted on a vehicle and including a control unit.

The control unit is configured to
- increment a first delay count when a sleep transition time exceeds a first prescribed time, the sleep transition time being a time from when an ECU mounted on the vehicle goes into a non-sleep state until the ECU returns to a sleep state, and
- output information on the ECU when the first delay count becomes equal to or greater than a first prescribed count.

According to the embodiment of the present disclosure, the technology related to detecting behaviors of ECUs is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
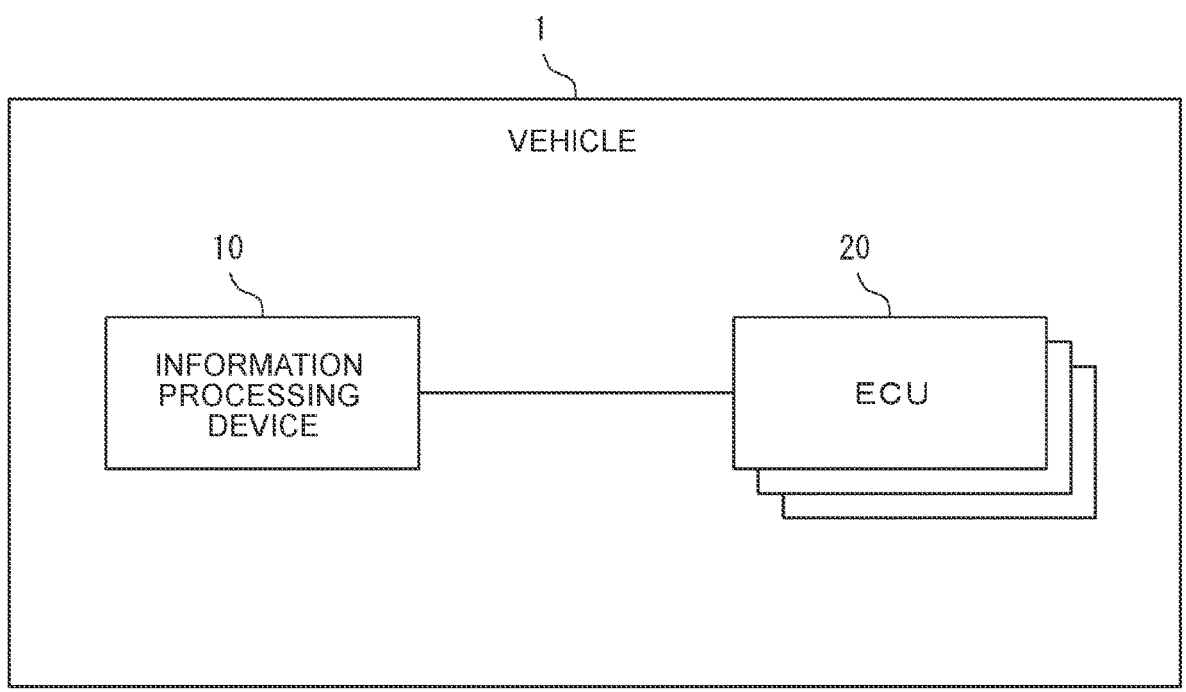
FIG. 1 is a block diagram showing the schematic configuration of a vehicle.

With reference to FIG. 1, an overview of a vehicle 1 according to an embodiment of the present disclosure will be described. Vehicle 1 includes an information processing device 10 and a plurality of ECUs 20. The information processing device 10 is communicably connected to a plurality of ECUs 20.

The information processing device 10 is, for example, a central ECU. The information processing device 10 may be able to communicate with a center that manages the vehicle 1 via a network (not shown).

First, the outline of the present embodiment will be described, and the details will be described later. The information processing device 10 increments a first delay count when the sleep transition time from when the ECU 20 mounted on the vehicle 1 goes into a non-sleep state until the ECU 20 returns to a sleep state exceeds a first prescribed time. Then, the information processing device 10 outputs information regarding the ECU 20 when the first delay count becomes equal to or greater than the first prescribed count.

If the sleep transition time of the ECU 20 becomes longer than expected, it may lead to an increase in vehicle power consumption and a dead battery. According to the present embodiment, since the information of the ECU 20 is output when the sleep delay count of the ECU 20 exceeds the prescribed count, the behavior of the ECU 20 that increases power consumption of the vehicle can be detected at an early stage. Therefore, according to this embodiment, the technology related to detecting the behavior of the ECU 20 is improved. Further, the information regarding the ECU 20 output by the present embodiment may be useful, for example, for analyzing the cause of the sleep delay in the ECU 20 and determining countermeasures.

Next, each configuration of the vehicle 1 will be explained in detail.

Configuration of Information Processing Device

Figure 2:
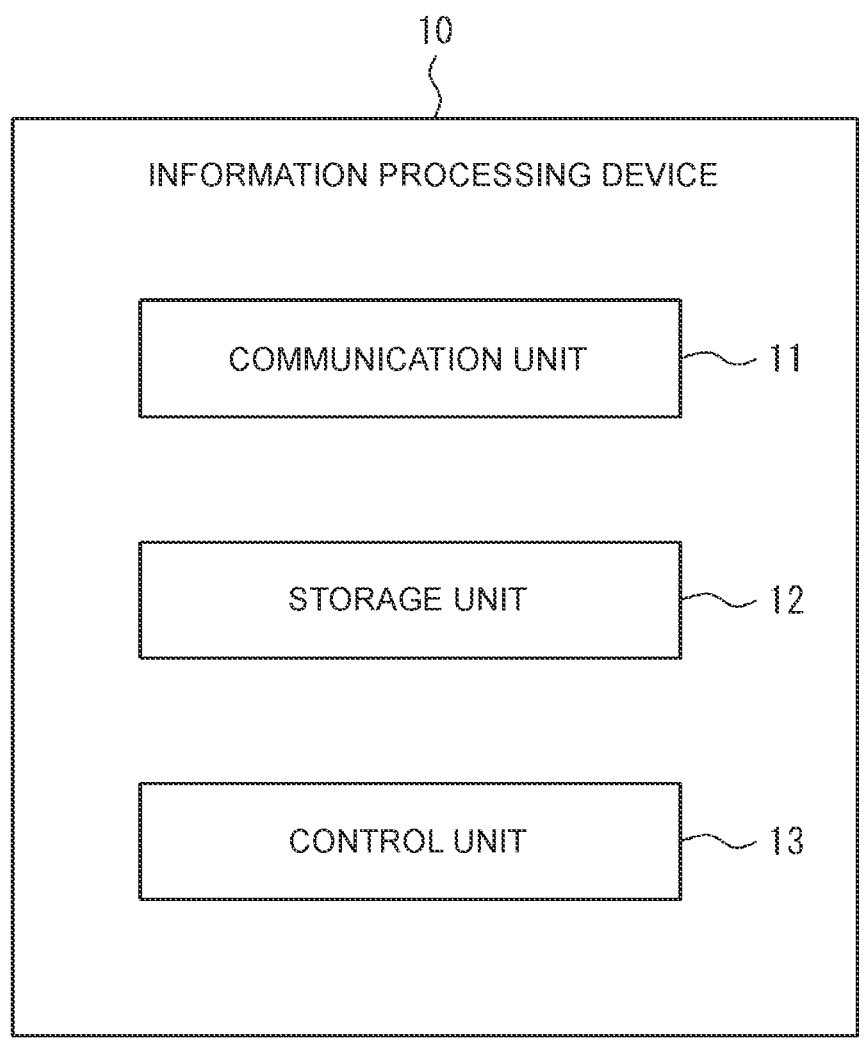
FIG. 2 is a block diagram showing a schematic configuration of an information processing device mounted on a vehicle.

As shown in FIG. 2, the information processing device 10 includes a communication unit 11, a storage unit 12, and a control unit 13.

The communication unit 11 includes one or more in-vehicle network communication interfaces that connect to the plurality of ECUs 20 and one or more Internet communication interfaces that connect to an external network. Communication interfaces for in-vehicle networks are compatible with in-vehicle network communication standards such as Controller Area Network (CAN) and Ethernet (registered trademark), but are not limited to these. Communication Interface The communication interface for the Internet corresponds to mobile communication standards such as, but not limited to, 4th Generation (4G) or 5th Generation (5G). In this embodiment, the information processing device 10 communicates with a plurality of ECUs 20 via the communication unit 11.

The storage unit 12 includes one or more memories. The memories are, for example, a semiconductor memory, a magnetic memory, or an optical memory, but are not limited to these memories. Each memory included in the storage unit 12 may function as, for example, a main storage device, an auxiliary storage device, or a cache memory. The storage unit 12 stores any information used for the operation of the information processing device 10. For example, the storage unit 12 may store a system program, an application program, and embedded software. The information stored in the storage unit 12 may be updatable, for example, with information acquired via the communication unit 11.

The control unit 13 includes one or more processors, one or more programmable circuits, one or more dedicated circuits, or a combination thereof. The processor is, for example, a general-purpose processor such as a Central Processing Unit (CPU) or a Graphics Processing Unit (GPU), or a dedicated processor specialized for specific processing, but is not limited to these. The programmable circuit is, for example, a Field-Programmable Gate Array (FPGA), but is not limited thereto. The dedicated circuit is, for example, an Application Specific Integrated Circuit (ASIC), but is not limited thereto. The control unit 13 controls the overall operation of the information processing device 10.

Operation Flow of Information Processing Device

Figure 3:
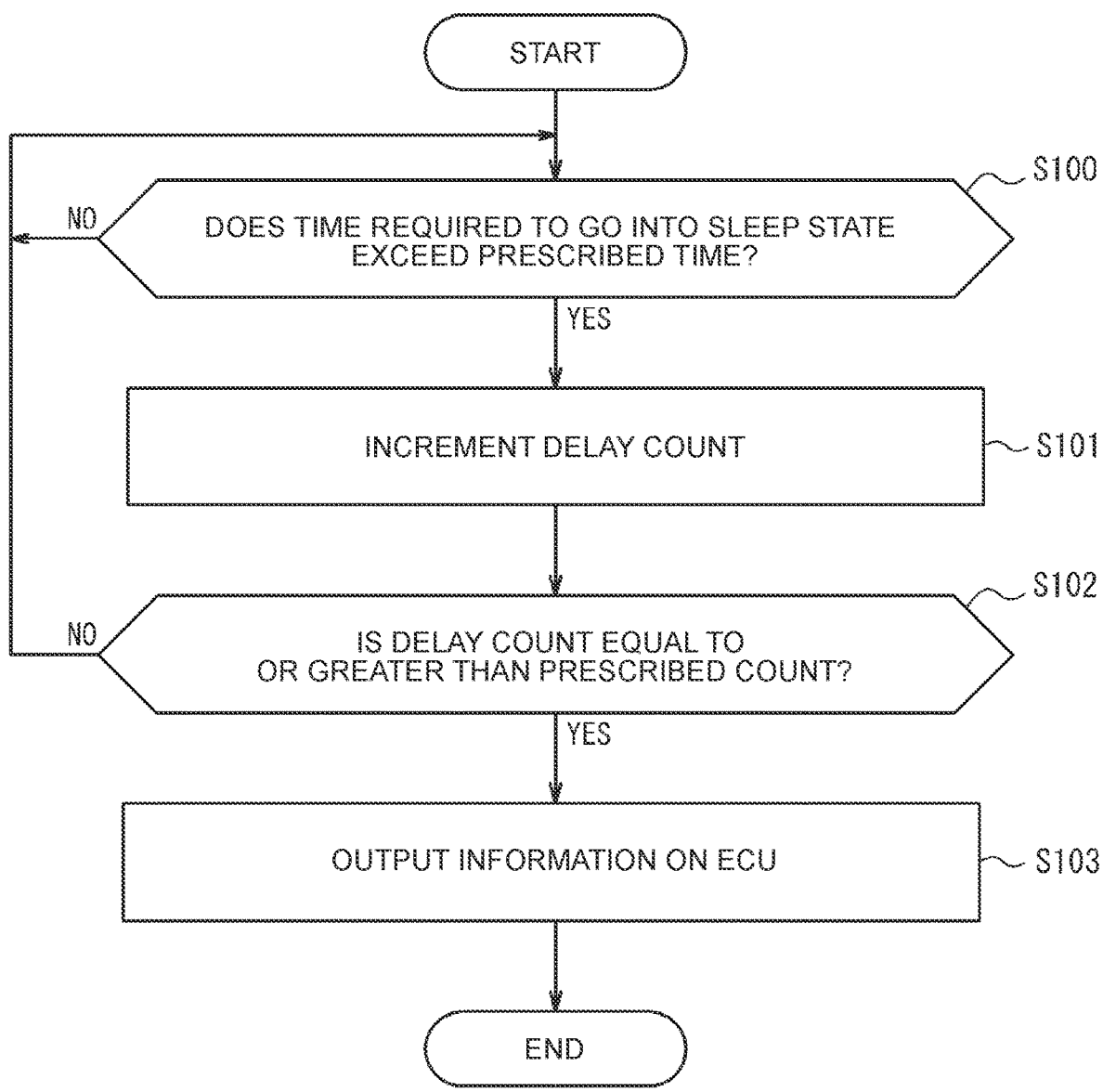
FIG. 3 is a flowchart showing the operation of the terminal device mounted on the vehicle.

The operation of the information processing device 10 according to this embodiment will be described with reference to FIG. 3.

S100: The control unit 13 of the information processing device 10 determines whether the sleep transition time from when each ECU 20 installed in the vehicle 1 goes into the non-sleep state until it returns to the sleep state has exceeded the first prescribed time. When it is determined that the sleep transition time has exceeded the first prescribed time (S100—Yes), the process proceeds to S101. When it is determined that the sleep transition time has not exceeded the first prescribed time (S100—No), the process returns to S100.

The "first prescribed time" refers to a time determined in advance as a normal value of the sleep transition time from when the ECU 20 goes into the communication state (non-sleep state) until it goes into the sleep state. For example, when a situation in which the sleep transition time exceeds the prescribed time repeatedly occurs, it is highly likely that some abnormality has occurred in the ECU 20. Further, if a situation in which the sleep transition time exceeds the prescribed time repeatedly occurs, the battery is consumed more than expected, and the probability of the battery dying increases. The first prescribed time may be different for each ECU 20 or may be changeable.

Specifically, the control unit 13 starts monitoring the time when any ECU 20 enters a non-sleep state in which it starts communicating with the information processing device 10. The control unit 13 continues to monitor the time while the ECU 20 is communicating with the information processing device 10, and determines whether the time since entering the non-sleep state has exceeded the first prescribed time. When the sleep transition time has exceeded the first prescribed time (S100—Yes), the control unit 13 determines that a sleep delay has occurred, and the process proceeds to S101. When the sleep transition time has not exceeded the first prescribed time (S100—No), the control unit 13 determines that no sleep delay has occurred, and the process returns to S100.

The "sleep delay" refers to the sleep transition time exceeding the first prescribed time.

S101: When it is determined in S100 that the sleep transition time has exceeded the first prescribed time (S100—Yes), the control unit 13 determines that a sleep delay has occurred and increments the first delay count.

S102: The control unit 13 determines whether the first delay count becomes equal to or greater than the first prescribed count. When it is determined that the first delay count becomes equal to or greater than the first prescribed count (S102—Yes), the process proceeds to S103. When it is determined that the first delay count is not equal to or greater than the first prescribed count (S102—No), the process returns to S100.

Specifically, when the first delay count becomes equal to or greater than the first prescribed count (S102—Yes), the control unit 13 determines that some abnormality has occurred in the ECU 20, and the process proceeds to S101. When the first delay count is less than the first prescribed count (S100—No), the control unit 13 determines that it is too early to assume that some abnormality has occurred in the ECU 20, and the process returns to S100.

Here, the first prescribed count may be different for each ECU 20 or may be changeable.

S103: When it is determined in S102 that the first delay count becomes equal to or greater than the first prescribed count (S100—Yes), the control unit 13 outputs information on the ECU 20.

Specifically, the control unit 13 sends information on the ECU 20 to a server (not shown) at a center that manages the communicable vehicles 1 via the network. However, the information processing device 10 may output information by any method not limited to this example, such as storing information regarding the ECU 20 in the storage unit 12 and storing it in a server at a center using a portable medium. This method can be adopted.

The "information on the ECU 20" may include identification information of the ECU 20, the time when the delay occurred, the sleep transition time, and the first delay count. Further, the information is not limited to these, and may include any information on the ECU 20.

As described above, the information processing device 10 according to the present embodiment increments the first delay count when the time from when the ECU 20 mounted on the vehicle 1 goes into the non-sleep state until the ECU 20 returns to the sleep state exceeds the first prescribed time. The information processing device 10 outputs information on the ECU 20 when the first delay count becomes equal to or greater than the first prescribed count.

According to this configuration, since information on the ECU 20 is output when the sleep delay count of the ECU 20 exceeds the prescribed count, the behavior of the ECU 20 that increases power consumption of the vehicle can be detected at an early stage. Therefore, according to this embodiment, the technology related to detecting the behavior of the ECU 20 is improved. Further, the information regarding the ECU 20 output by the present embodiment may be useful, for example, for analyzing the cause of sleep delay in the ECU 20 and determining countermeasures.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, in the embodiment described above, an embodiment in which the configuration and operation of the information processing device 10 are distributed among multiple computers that can communicate with each other is also possible. For example, an embodiment is also possible in which some or all of the components of the information processing device 10 are provided in a server (not shown) at a center that manages vehicles 1 that can communicate via a network. For example, a server (not shown) at a center that manages vehicles 1 that can communicate via a network may include some or all of the components of information processing device 10.

For example, in the above embodiment, when the first delay count of the ECU 20 becomes equal to or greater than the first prescribed count, the control unit 13 may switch the operation mode of the ECU 20 from a first mode in which the ECU 20 goes to the sleep state after performing a predetermined plurality of processes to a second mode in which the ECU 20 goes into the sleep state after performing only part of the plurality of processes. Specifically, for example, the levels of priority of the processes that are performed by each ECU 20 are set in advance, and when the first delay count of the ECU 20 becomes equal to or more than the first prescribed count, the control unit 13 switches the operation mode from the first mode in which the ECU 20 goes into the sleep state after performing the predetermined plurality of processes to the second mode in which the ECU 20 goes into the sleep state after performing only part of the plurality of processes.

When a delay still occurs even after switching the operation mode of the ECU 20 to the second mode, the control unit 13 may switch the operation mode to a third mode in which the ECU 20 goes into the sleep state after performing only part of the processes further selected based on the priority.

For example, in the above embodiment, when the first delay count of the ECU 20 becomes equal to or greater than the first prescribed count, the control unit 13 may control to supply power from an auxiliary battery provided in another ECU 20 to the ECU 20.

For example, in the above embodiment, the control unit 13 may increment the second delay count when the sleep transition time exceeds the second prescribed time that is longer than the first prescribed time. The control unit 13 may output information on the ECU 20 when the second delay count becomes equal to or greater than the second prescribed count that is smaller than the first prescribed count.

Since the second prescribed time is longer than the first prescribed time, the influence on the battery is also relatively large. For this reason, it is desirable to output information on the ECU 20 earlier by setting the second prescribed count that is smaller than the first prescribed count. A sleep delay that exceeds the second prescribed time is more likely to indicate that some kind of abnormality has occurred in the ECU 20 than a sleep delay that exceeds only the first prescribed time. There is a high probability that Therefore, by further acquiring such information, it is possible to further analyze the cause of the sleep delay in the ECU 20 and determine countermeasures. The second prescribed time may be different for each ECU 20 or may be changeable. The second prescribed count may also be different for each ECU 20, or may be changeable.

Further, for example, the control unit 13 may implement the above-described embodiment in a situation where the ECU 20 is driven only by power supplied from an on-board battery.

Furthermore, an embodiment is also possible in which, for example, a general-purpose computer functions as the information processing device 10 according to the embodiment described above. Specifically, a program describing processing contents for realizing each function of the information processing device 10 according to the above embodiment is stored in the memory of the general-purpose computer, and the program is read out and executed by the processor. Therefore, the present disclosure can also be realized as a program that can be executed by the processor or a non-transitory computer-readable medium that stores the program.

What is claimed is:

1. A method that is performed by an information processing device mounted on a vehicle, the method comprising:
   incrementing a first delay count when a sleep transition time exceeds a first prescribed time, the sleep transition time being a time from when an electronic control unit mounted on the vehicle goes into a non-sleep state until the electronic control unit returns to a sleep state; and
   outputting information on the electronic control unit when the first delay count becomes equal to or greater than a first prescribed count, wherein the information on the electronic control unit includes all of: i) a time when the first delay count becomes equal to or greater than the first prescribed count, ii) the sleep transition time, and iii) the first delay count.

2. The method according to claim 1, further comprising switching an operation mode of the electronic control unit from a first mode to a second mode when the first delay count of the electronic control unit becomes equal to or greater than the first prescribed count, the first mode being a mode in which the electronic control unit goes into the sleep state after performing a predetermined plurality of processes, and the second mode being a mode in which the electronic control unit goes into the sleep state after performing only part of the processes.

3. The method according to claim 1, further comprising controlling to supply power from an auxiliary battery provided in another electronic control unit to the electronic control unit when the first delay count of the electronic control unit becomes equal to or greater than the first prescribed count.

4. The method according to claim 1, further comprising:
   incrementing a second delay count when the sleep transition time exceeds a second prescribed time that is longer than the first prescribed time; and
   outputting information on the electronic control unit when the second delay count becomes equal to or greater than a second prescribed count that is smaller than the first prescribed count.

5. An information processing device mounted on a vehicle, the information processing device comprising a control unit, wherein the control unit is configured to
   increment a first delay count when a sleep transition time exceeds a first prescribed time, the sleep transition time being a time from when an electronic control unit mounted on the vehicle goes into a non-sleep state until the electronic control unit returns to a sleep state, and
   output information on the electronic control unit when the first delay count becomes equal to or greater than a first prescribed count, wherein the information on the electronic control unit includes all of: i) a time when the first delay count becomes equal to or greater than the first prescribed count, ii) the sleep transition time, and iii) the first delay count.

6. The method according to claim 2, further comprising, even after switching the operation mode of the electronic control unit to the second mode, when the sleep transition time still exceeds the first prescribed time, switching the operation mode of the electronic control unit from the second mode to a third mode, the third mode being a mode in which the electronic control unit goes into the sleep state after performing only part of the processes further selected based on priority.

7. The method according to claim 4, wherein the second prescribed time is different for each electronic unit, and the second prescribed count is separately counted for each electronic unit.

* * * * *